United States Patent [19]

Kamiyama et al.

[11] Patent Number: 5,520,484
[45] Date of Patent: May 28, 1996

[54] EVERSION NOZZLE, AND A METHOD FOR REPAIRING AN UNDERGROUND TUBULAR CONDUIT

[75] Inventors: Takao Kamiyama, Hiratsuka; Yasuhiro Yokoshima; Shigeru Endoh, both of Ibaraki, all of Japan

[73] Assignees: Shonan Gosei-jushi Seisakusho K.K., Kanagawa; Yokoshima & Company; Get Inc., both of Ibaraki, all of Japan

[21] Appl. No.: 383,125

[22] Filed: Feb. 3, 1995

[51] Int. Cl.$^6$ .................................... F16L 55/16
[52] U.S. Cl. ............................ 405/154; 138/97; 156/287; 156/294; 405/150.1
[58] Field of Search .................................... 405/150.1, 154; 138/97, 98; 156/156, 287, 294; 264/269

[56] References Cited

U.S. PATENT DOCUMENTS

| | | | |
|---|---|---|---|
| 4,334,943 | 6/1982 | Zenbayashi et al. | 156/287 |
| 4,350,548 | 9/1982 | Zenbayashi et al. | 156/156 |
| 4,770,562 | 9/1988 | Muller et al. | 405/154 |
| 5,358,359 | 10/1994 | Long, Jr. | 405/154 |
| 5,384,086 | 1/1995 | Smith | 264/516 |

FOREIGN PATENT DOCUMENTS

| | | | |
|---|---|---|---|
| 2057341 | 6/1992 | Canada | 138/97 |
| 68997 | 6/1979 | Japan | 405/154 |
| 60-242038 | 12/1985 | Japan . | |
| 633934 | 1/1988 | Japan | 264/269 |
| 3187724 | 8/1991 | Japan | 156/287 |

*Primary Examiner*—Hoang C. Dang
*Attorney, Agent, or Firm*—Lowe, Price, LeBlanc & Becker

[57] ABSTRACT

An eversion nozzle used in the operation of repairing an underground tubular conduit by lining the inner wall of the tubular conduit with an everted tubular liner bag impregnated with a hardenable liquid resin: the inventive eversion nozzle is a hollow straight cylinder and its length L and inner diameter D hold:

$D/5 < L < 2D;$ a novel eversion method is also provided wherein the above eversion nozzle is utilized.

7 Claims, 10 Drawing Sheets

EVERSION NOZZLE, AND A METHOD FOR REPAIRING AN UNDERGROUND TUBULAR CONDUIT

BACKGROUND OF THE INVENTION

1. Field of the Invention

The present invention relates to an eversion nozzle, a method for everting a tubular liner bag by means of the nozzle, and a process for repairing an underground tubular conduit by lining the inner wall of the tubular conduit with the tubular liner bag.

2. Description of the Prior Art

When an underground tubular conduit, such as pipelines and passageways, becomes defective or too old to perform reliably, the tubular conduit is repaired and rehabilitated without digging the earth to expose the tubular conduit and disassembling the sections of the tubular conduit. This non-digging method of repairing an underground conduit has been known and practiced commonly in the field of civil engineering. Typically, the method is disclosed by Japanese Provisional Patent Publication (Kokai) Sho 60-242038.

According to this publication, this method of conduit repair comprises inserting a sufficiently long tubular flexible liner bag into the tubular conduit to be repaired by means of a pressurized fluid, like air and water. The tubular liner bag is made of a flexible resin-absorbent material impregnated with a thermosetting liquid resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old tubular conduit in a manner such that the wide-opened end of the liner completely and fixedly covers and closes the conduit end; a portion of the liner is pushed into the conduit; then, the pressurized fluid is applied to the said portion of the tubular liner such that the fluid urges the tubular liner to enter the conduit. Since one end of the tubular liner is hooked at the end of the conduit, it remains there while the rest of the flexible liner bag is turned inside out as it proceeds deeper in the conduit, and this manner of insertion is exactly what is meant by the term "everting" as used above and it shall mean so throughout this application document. When the entire length of the tubular liner bag is everted (i.e., turned inside out) into the conduit, the control rope holds the closed end of the tubular liner bag to thereby control the length of the tubular liner in the conduit. Then, the everted tubular liner is pressed against the inner wall of the conduit by the said pressurized fluid, and the tubular flexible liner is hardened as the thermosetting liquid resin impregnated in the liner is heated, which is effected by heating the fluid filling the tubular liner bag by means of a hot steam, etc. It is thus possible to line the inside wall of the defective or old conduit with a rigid liner without digging the ground and disassembling the conduit sections.

Now, in a more modern method, an eversion nozzle such as the one (101) shown in FIG. 14 has been employed for the purpose of causing the tubular liner bag to evert more effectively.

In the case of FIG. 14, the eversion nozzle 101, which is an elbow pipe having a right-angled bend, is installed in the bottom of a manhole 108, and the open end of the liner bag 106 is passed through the nozzle 101 from the inlet port and turned inside out at the outlet port thereof to wrap over the brim of the outlet port and fixed thereat. At the inlet port of the eversion nozzle 101 is fixed the lower end of a guide tube 107.

That portion of the tubular liner bag 106 yet to be turned inside out (everted) is suspended inside the eversion nozzle 101 and the guide tube 107 and its closed end portion is coiled on the ground ready to real off. The upper end of the guide tube 107 is fixed at a support frame 111 installed on the ground. Furthermore, one end of a draining hose 110 is connected to the eversion nozzle 101, and the other end of the draining hose 110 is held over a water tank 137 to pour water therein.

Thus, when water is charged into the guide tube 107 from the charge hose 112, the tubular liner bag 106 is caused by the water head to evert into the tubular conduit 113, as indicated by the arrows in the conduit 113.

Problems the Invention Seeks to Solve

As is the case with the manhole 108 of FIG. 14, generally a manhole to a sewer pipe is designed to have a smaller diameter at the entrance than inside. Commonly, the interior diameter $d_1$ is 900 mm and the entrance diameter $d_2$ is only 600 mm.

Therefore, in order to introduce an eversion nozzle such as the one 101 into a manhole 108, the length L of the nozzle ought to be substantially smaller than the entrance diameter $d_2$ of the manhole 108. However, usually the length L of a nozzle is designed to be at least twice as great as the inner diameter D thereof, so that when the entrance diameter of the manhole is 600 mm, the length L must be less than 600 mm and hence the inner diameter D of the nozzle must be substantially smaller than 300 mm. Consequently, the tubular liner bag that can pass the nozzle must have outer diameter less than 30 mm. For this reason, the conventional eversion nozzle 101 could not be used in the cases where the inner diameter of the tubular conduit to be repaired is 300 mm or greater.

Thus, when a tubular conduit having an inner diameter of 300 mm or greater was repaired, it was necessary to install an eversion nozzle outside the manhole, that is, on the ground, attach the tubular liner bag to the nozzle, and evert the liner bag from outside the manhole. This resulted in a situation wherein the length of that part of the everted liner bag which is suspended in the manhole and not used to line the tubular conduit is substantially large, and this was very uneconomical. Especially when the depth of the manhole was great, not only the wasted amount of the tubular liner bag was large, the labor of removing that wasted part from the manhole was time-consuming.

The present invention was contrived in view of the above problems, and it is, therefore, an object of the invention to provide a new eversion nozzle and a new method for everting the tubular liner bag with which it becomes possible to line a tubular conduit having a relatively large diameter without wasting much length of the tubular liner bag. Thus, a new process of repairing a tubular liner conduit is also proposed in this invention.

SUMMARY OF THE INVENTION

Means to Solve the Problems

In order to attain the above and other objects of the invention, there is provided an improved eversion nozzle, which is a hollow cylinder whose length L and inner diameter D hold the following relation:

$D/5 < L < 2D$.

The present inventors further propose a novel method for repairing a tubular conduit wherein the inventive eversion nozzle is utilized, which consists of the steps of: (a) preparing a hollow cylindrical eversion nozzle whose length L and inner diameter D hold the relation such that $D/5 < L < 2D$; (b) passing the open end of the tubular liner bag through the eversion nozzle from the inlet side of the eversion nozzle and turning the open end of the tubular liner bag inside out to wrap round the brim of the outlet side of the eversion nozzle and to be fixed thereat; (c) fixing one end of a guide tube around the brim of the inlet side of the eversion nozzle; (d) lowering said eversion nozzle to the bottom of a manhole while holding the eversion nozzle vertically with its outlet port facing downward; (e) turning the eversion nozzle to lie horizontally such that its outlet port looks toward the tubular conduit; (f) supplying a pressurized fluid into said eversion nozzle to thereby evert said tubular liner bag from the eversion nozzle into said tubular conduit; and (g) curing the hardenable liquid resin in said everted tubular liner bag to thereby harden the bag.

It is further suggested that in this method the guide tube be resilient at its end portion such that said end portion can be straightened but when left alone it curls into a 90-degree bend. This prevents formation of a pleat at the bend of the guide tube.

The inventors, however, propose to make use of this pleat, too, by the following manner: the eversion nozzle has an introduction port by which air is received into said nozzle, and at step (f) above said fluid is water, and a closed space (S) is defined by the everted tubular liner bag, the eversion nozzle and the pleat formed at the bend of the guide tube, and then pressurized air is supplied to said eversion nozzle via the introduction port.

It is also proposed to use an eversion nozzle whose inner space is divided into a main room and a corridor room by means of a perforated partition, said main room having an introduction port by which air is received and said lower room having a drain port by which fluid is let out at a location slightly higher than the central axis of the eversion nozzle. Then, the upper end of the guide tube is sealed, and after the eversion is completed, hot water is sprinkled on the inner wall of the everted liner bag, and during the sprinkling, pressurized air is supplied into the everted liner bag to thereby cause the sprinkled water to be discharged from said drain port of the eversion nozzle.

It is optional to supply the pressurized air via said introduction port of the eversion nozzle, too.

Effects of the Invention

According to the invention, the eversion nozzle is a hollow cylinder in shape and when it is introduced into a manhole together with the tubular liner bag and the guide tube, it is held vertically with its outlet port facing downward, so that it can enter the manhole only if its diameter D is substantially smaller than the entrance diameter of the manhole. Therefore, in designing the eversion nozzle the diameter D can be increased as much as possible without approaching too closely to the entrance diameter of the manhole.

Furthermore, the inventors found that when the eversion nozzle is designed such that its length L is greater than one fifth of its inner diameter D but smaller than twice of D, i.e., $D/5 < L < 2D$, it turns easily in the narrow bottoms of manholes.

As described above, the inner diameter D of the eversion nozzle can be increased quite close to the entrance diameter of the manhole, so that even when the underground tubular conduit has a diameter as large as the entrance diameter of the manhole, it is possible to evert the tubular liner bag of a correspondingly large diameter into the tubular conduit by means of the eversion nozzle which is installed inside the manhole. Therefore, it is now not necessary to install the eversion nozzle on the ground and thus sacrifice a considerable length of the tubular liner bag, which length extends from the eversion nozzle on the ground to the end of the underground tubular conduit and is not used to line the conduit, unlike the conventional method. As the result, a substantial cost reduction is brought about.

In the case of the embodiment wherein the two-room eversion nozzle is used, since the drain port by which fluid is let out is located slightly higher than the central axis of the eversion nozzle, even when a lower part of the eversion nozzle is hidden in a ditch formed in the bottom of a manhole, it is now possible to let the hot water stream out from the eversion nozzle.

Thus, the present invention attains the above-mentioned objects.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more precisely understood from the detailed description given hereinbelow and the accompanying drawings which are given by way of illustration only, and thus are not limitative of the present invention.

DETAILED DESCRIPTION OF THE INVENTION

Embodiments

Next, embodiments of the invention will be described with reference to the attached drawings.

Figure 1:
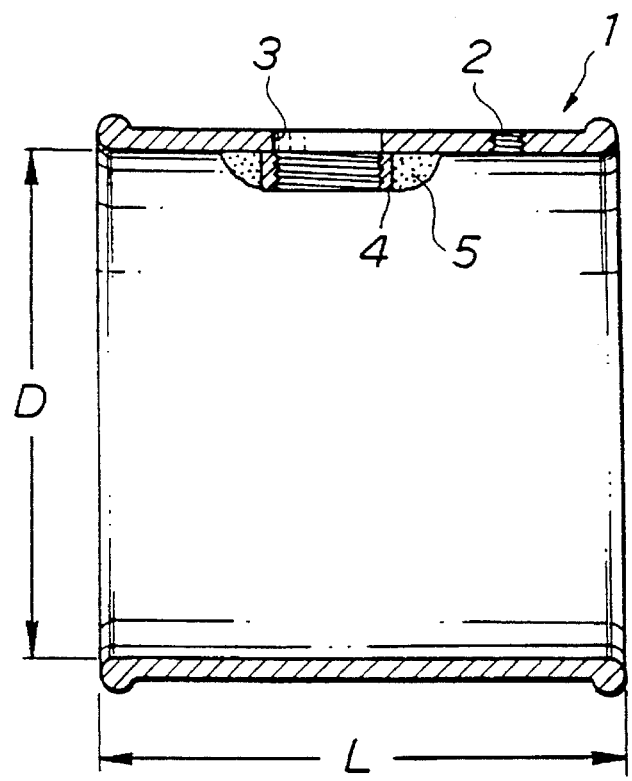
FIG. 1 is a sectional view of an eversion nozzle according to a first embodiment of the invention.

FIG. 1 is a vertically-slit sectional view of an eversion nozzle 1 according to the invention. The eversion nozzle 1 is formed in a hollow cylinder having a screw hole 2 and a circular bore 3 made through at its top portion, and a cylindrical ring joint 4 having the same inner diameter as the diameter of the bore 3 is attached to the inner wall of the eversion nozzle 1 at the location such that the circular bore 3 coincides with the hole of the ring joint 4, as shown in FIG. 1. The inner wall of the joint ring 4 is cut with a screw thread. Resin 5 is plastered to the outer wall of the joint ring 4 so as to prevent the joint ring 4 from damaging a tubular liner bag 6, described later.

The eversion nozzle 1 of the present embodiment is designed such that its length L is greater than one fifth of its inner diameter D but smaller than twice of D, i.e., $D/5 < L < 2D$.

Next, the method for everting the tubular liner bag in which the eversion nozzle 1 is employed shall be explained with reference to FIGS. 2 through 6. Incidentally, FIGS. 2 through 6 are sectional views to show in sequence the procedure of everting the tubular liner bag, and FIG. 6 provides an enlarged view of a more functional portion of FIG. 5.

Figure 2:
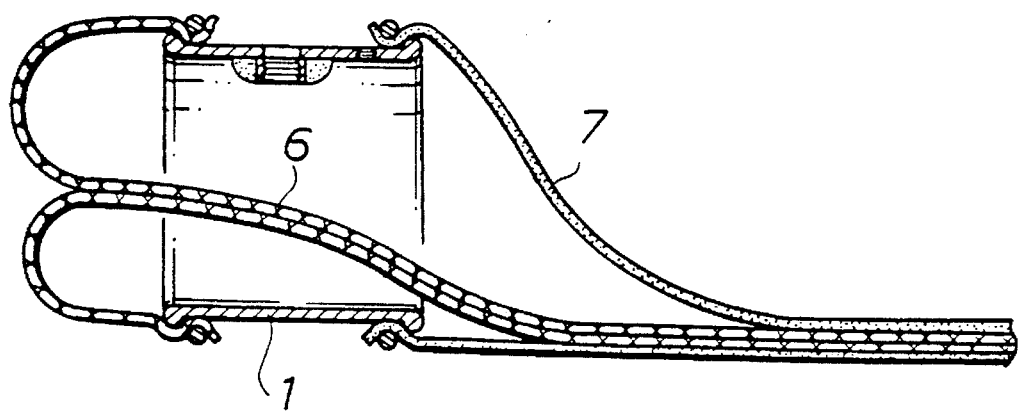
FIG. 2 is a sectional view useful to explain a manner of preparing the eversion nozzle according to the invention.

First, as shown in FIG. 2, the eversion nozzle 1 is held over the ground in manner such that it poses roughly horizontally. The open end of the tubular liner bag 6 is passed through the eversion nozzle 1 from the inlet side of the eversion nozzle 1 and turned inside out to wrap round the brim of the outlet side of the eversion nozzle 1, and anchored thereat. One end of a guide tube 7 is similarly fixed around the brim of the inlet side of the eversion nozzle 1. Thus, a length of the uneverted portion of the tubular liner bag 6 is contained in the eversion nozzle 1 and the guide tube 7. Incidentally, the tubular liner bag 6 is prepared in the following manner. A rectangular nonwoven resin-absorbable fabric of polyester felt is sewed into a tubular shape. This tubular pipe liner is then impregnated with a hardenable liquid resin (thermosetting or photosetting) and is coated with an air- and water-tight film which hermetically covers at least the outer surface of the tubular pipe liner. This hermetic film may be made of polyurethane, polyethylene or any other plastic material that forms an air- and water-tight film. When this tubular liner bag 7 is everted the hermetic film comes inner side of the bag 7.

Figure 3:
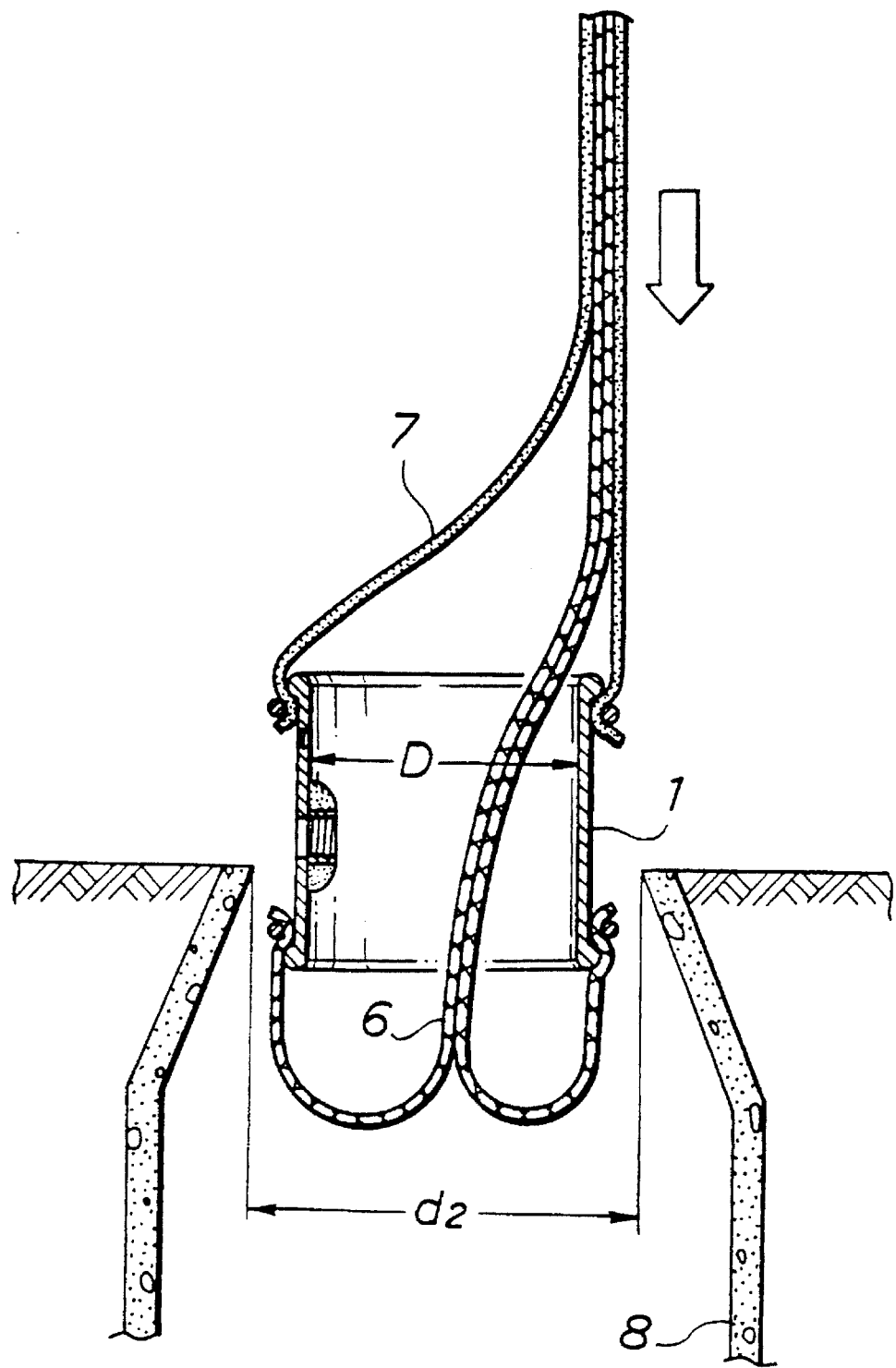
FIG. 3 is a sectional view useful to explain a manner of introducing the eversion nozzle into a manhole according to the invention.

Next, as shown in FIG. 3, the eversion nozzle 1 is held vertically with its outlet port, to which is attached the tubular liner bag 6, facing downward, and lowered into the manhole 8. On this occasion, the eversion nozzle 1 can pass through the entrance of the manhole 8, so long as the inner diameter D of the eversion nozzle 1 is substantially smaller than the entrance diameter (smallest diameter) $d_2$ of the manhole 8. Therefore, in designing the eversion nozzle 1 the diameter D can be increased as much as possible without approaching too closely to $d_2$, which is generally 600 mm. In this embodiment the diameter D is 524 mm. L is 500 mm.

Figure 4:
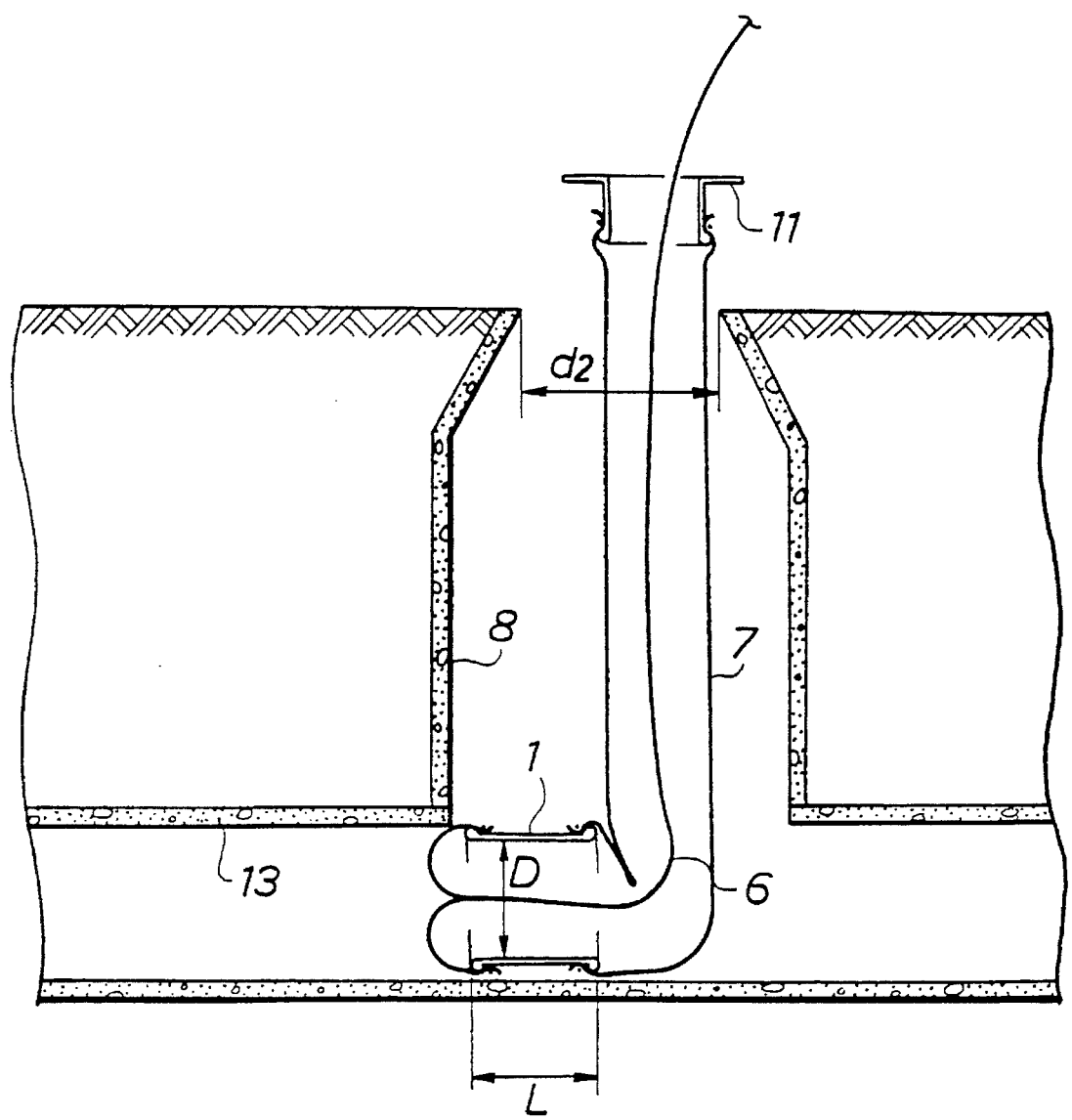
FIG. 4 is a sectional view useful to explain a manner of installing the eversion nozzle in the manhole according to the invention.

When the vertically supported eversion nozzle 1 has been introduced into the manhole 8 together with the tubular liner bag 6 and the guide tube 7 till it lands on the bottom of the manhole 8, then the eversion nozzle 1 is turned to lie horizontally such that its outlet port looks toward the tubular conduit 13 to be repaired, as shown in FIG. 4. On this occasion, since the eversion nozzle 1 has a length L such that $D/5 < L < 2D$, the turning of the eversion nozzle 1 in the bottom of the manhole 8 is conducted with ease.

Figure 5:
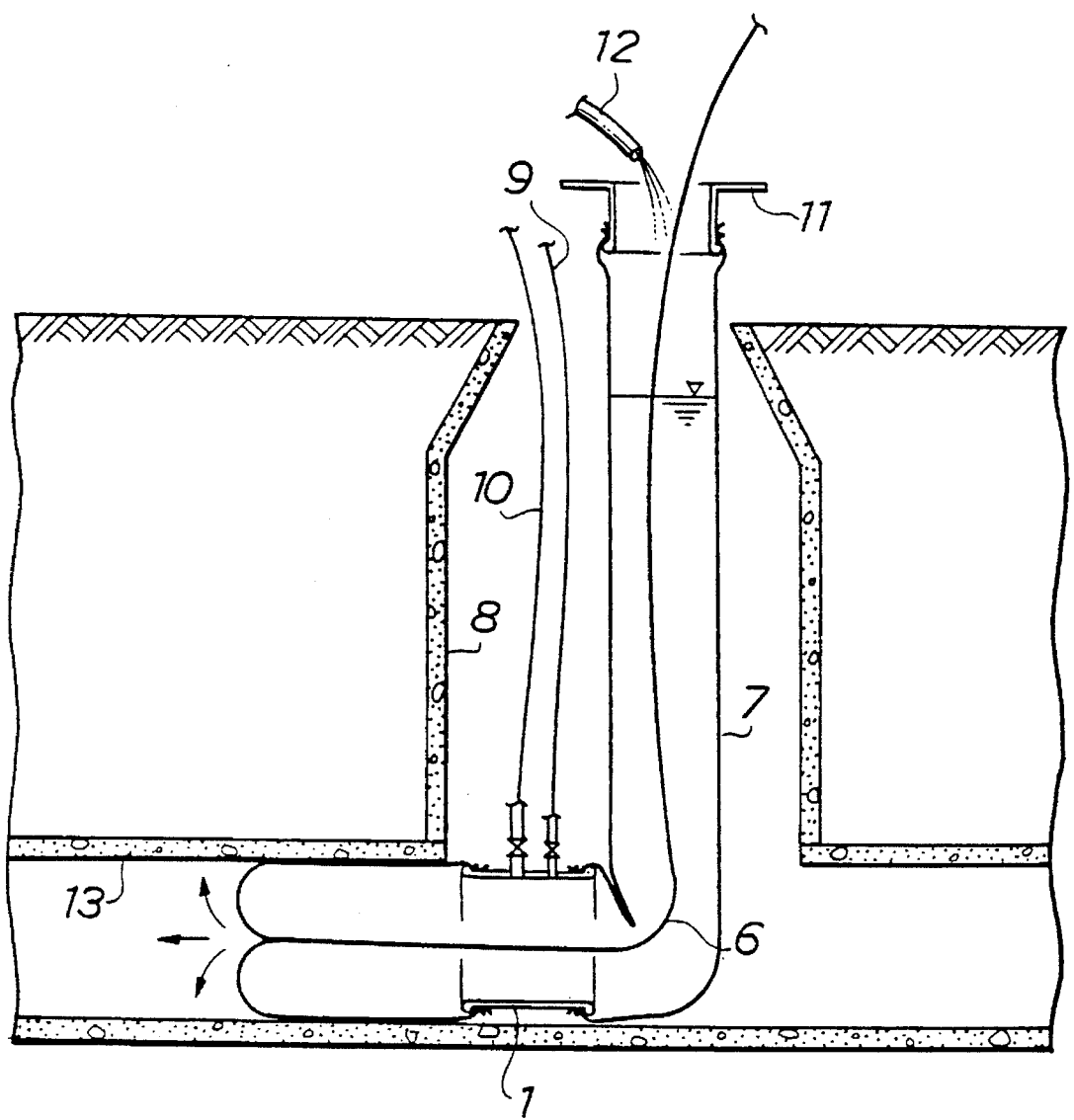
FIG. 5 is a sectional view useful to explain a manner of everting the tubular liner bag according to the invention.
Figure 6:
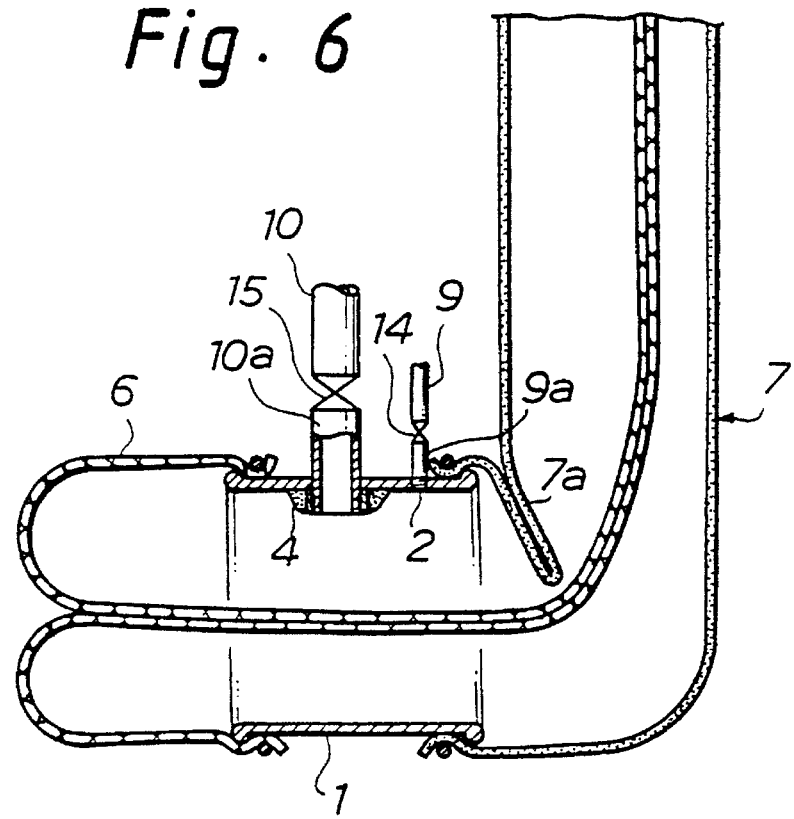
FIG. 6 is an enlarged view of a more relevant portion of FIG. 5 to explain the manner of everting the liner bag according to the invention.
Figure 7:
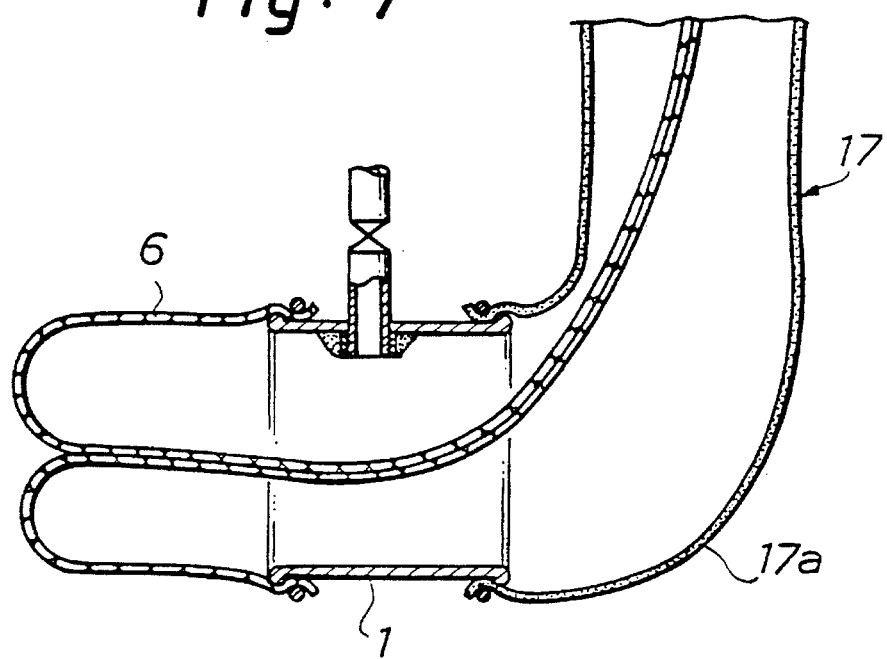
FIG. 7 is a sectional view to show another type of guide tube.

When the eversion nozzle 1 is thus set horizontally in the bottom of the manhole 8, the guide tube 7 is bent by 90 degrees at the portion where it is connected to the eversion nozzle 1, as shown in FIGS. 5 and 6, and the uneverted portion of the tubular liner bag 6 extends backward through the eversion nozzle 1 and the guide tube 7 and then the remainder is placed on the ground. Now, as shown in FIG. 6 in detail, an air hose 9 with a screwed metallic end piece 9a is screwed into the screw hole 2 made in the eversion nozzle 1 so that the air hose 9 communicates with the interior of the eversion nozzle 1. A valve 14 is provided across the air hose 9. Also, a draining hose 10 with a screwed metallic end piece 10a is screwed into the joint ring 4 to thereby connect the draining hose 10 to the eversion nozzle 1. Incidentally, the other end of the air hose 9 is connected to an air compressor, not shown, and the other end of the draining hose 10 is connected to a heating equipment such as boiler or to a draining pump. A valve 15 is provided across the draining hose 10.

When the air hose 9 and the draining hose 10 are thus connected to the eversion nozzle 1, water is supplied from a charge hose 12 into the upper open end of the guide tube 7, which is supported by a support frame 11, whereupon the tubular liner bag 6 is shot out from the eversion nozzle 1 pressed by the weight of the accumulated water and is everted into the tubular conduit 13. Incidentally, on this occasion, both the valve 14 of the air hose 9 and the valve 15 of the draining hose 10 are closed°

As an alternative procedure for causing the eversion, though it is not illustrated, one can choose to close the upper open end of the guide tube 7 airtight, then open the valve 14 to supply compressed air into the eversion nozzle 1, which compressed air is created by the air compressor, not shown, and transferred through the air hose 9; then the tubular liner bag 6 is puffed up and everted into the tubular conduit 13. Incidentally, on this occasion, the valve 15 of the draining hose 10 is kept closed.

When the tubular liner bag 6 has been everted until it occupies the entire length of the tubular conduit 13, the tubular liner bag 6 is pneumatically pressed against the inner wall of the tubular conduit 13, and at the same time treated with heat or light so that the hardenable liquid resin impregnated through the thickness of the tubular liner bag 6 is hardened and, as the result, the tubular conduit 13 is lined with the hardened tubular liner bag 6 and thus repaired.

As described above, the inner diameter D of the eversion nozzle 1 can be approximated as close as possible to the entrance diameter $d_2$ (600 mm) of the manhole 8, provided that it is not too large to prevent a smooth entrance of the vertically held nozzle 1 into the manhole 8, so that in this embodiment the inner diameter D of the eversion nozzle 1 is as large as 524 mm. Thus, even when the tubular conduit 13 has a diameter as large as the entrance diameter $d_2$ of the manhole 8, it is possible to evert the tubular liner bag 6 of a correspondingly large diameter into the tubular conduit 13 by means of the eversion nozzle 1 which is installed inside the manhole 8. Therefore, it is now not necessary to install the eversion nozzle on the ground and thus sacrifice a considerable length of the tubular liner bag 6, which length extends from the eversion nozzle on the ground to the end of the underground tubular conduit 13 and is not used to line the conduit 13, unlike the conventional method. As the result, a substantial cost reduction is accomplished.

Incidentally, in this embodiment, a straight flexible guide tube 7 is attached to the eversion nozzle 1, so that when the eversion nozzle 1 is turned to assume a roughly horizontal posture in the bottom of the manhole 8, the guide tube 7 is bent by roughly a right angle, as shown in FIG. 6, and as a result, a deep pleat 7a is formed at the bend. If, however, a guide tube 17 is used which is resilient such that it can be straightened but when left alone it is curled into a 90-degree bend at its end portion 17a, then, when the eversion nozzle 1 is turned to assume a roughly horizontal posture in the bottom of the manhole 8, no deep pleat can be formed in the guide tube 17.

Figure 8:
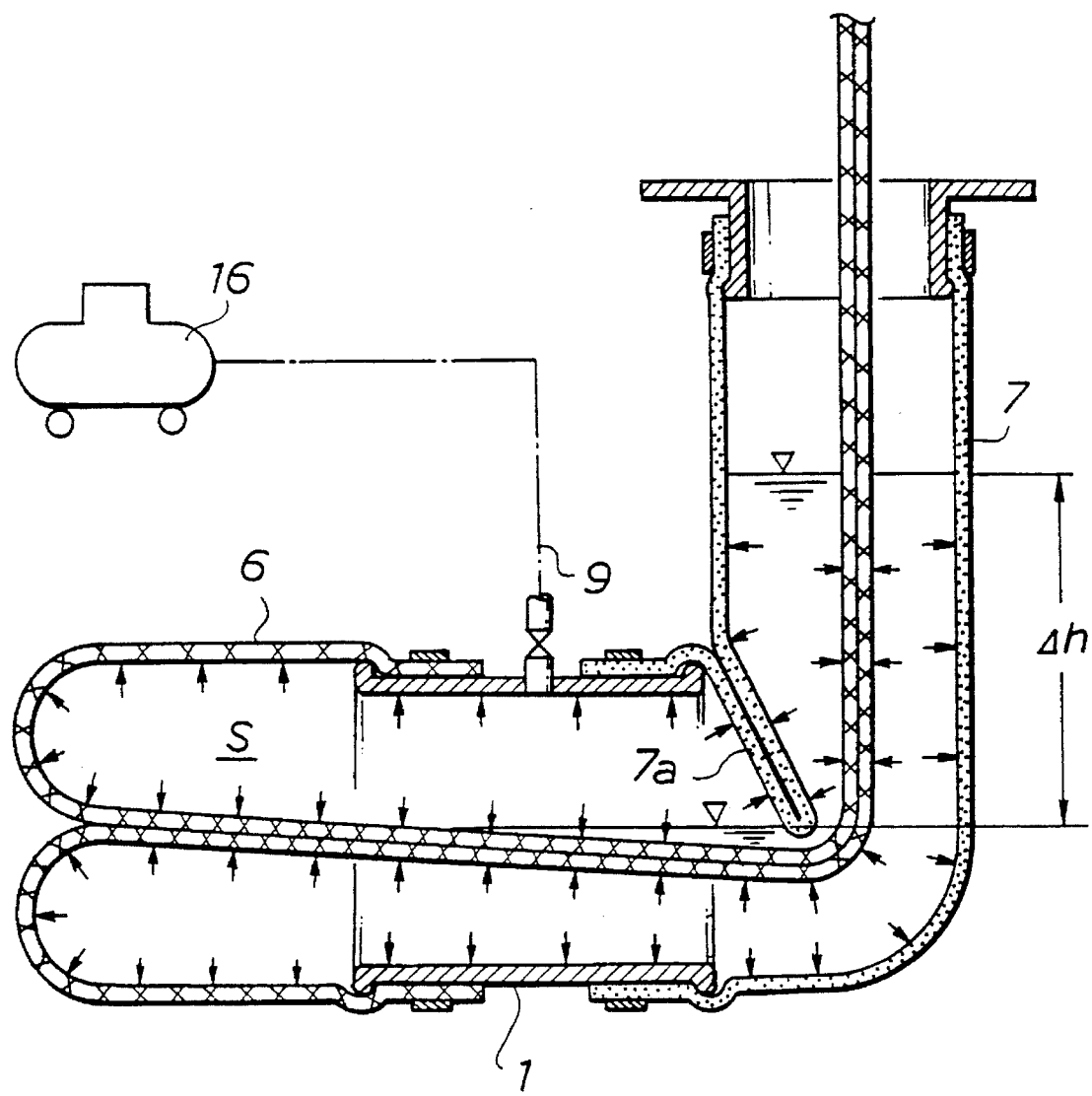
FIG. 8 is a sectional view useful to explain another manner of everting the tubular liner bag according to the invention.

On the other hand, the inventors have also worked on an eversion method wherein the pleat 7a of the guide tube 7 is made use of, as shown in FIG. 8. This new method is also described next.

With reference to FIG. 8, which is a sectional view of the elements importantly involved in this eversion operation, water is charged into the guide tube 7 from the upper open end; then, a compressor 16 is driven to supply compressed air to the eversion nozzle 1 by way of an air hose 9. On this occasion a closed space S is formed inside the eversion nozzle 1 and the tubular liner bag 6, which S is also defined by the water and the pleat 7a of the guide tube 7, the latter functioning as a barrage.

As the compressor 16 continues to supply the compressed air to the closed space S, the tubular liner bag 6 anchored at the eversion nozzle 1 is everted therefrom by the high air pressure. Incidentally, on this occasion, the following relation holds between the internal pressure P of the closed space S and the water head $\Delta h$:

$$P = \gamma \cdot \Delta h,$$

wherein $\gamma$ is specific gravity of water or the liquid employed.

Figure 9:
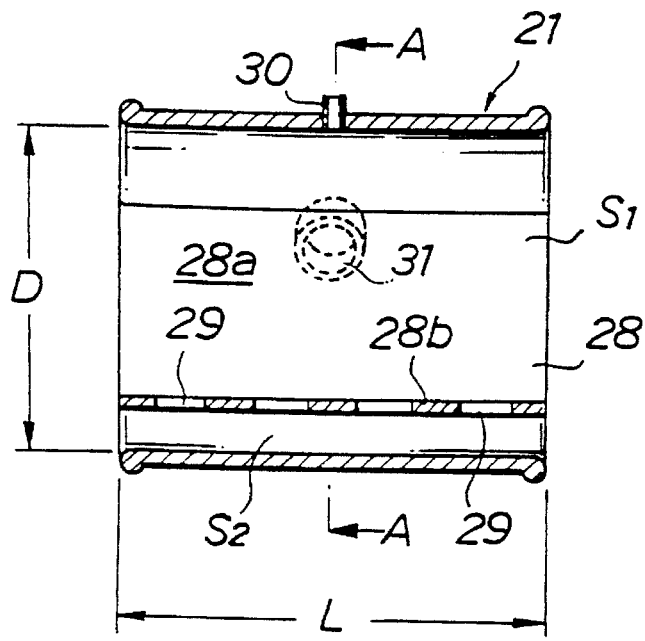
FIG. 9 is a vertically-slit sectional view of an eversion nozzle of a second embodiment according to the invention.
Figure 10:
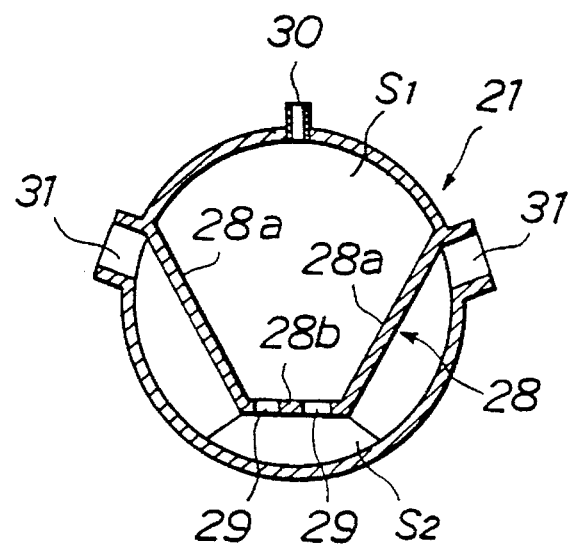
FIG. 10 is a cross section taken along the line A—A of FIG. 9.
Figure 11:
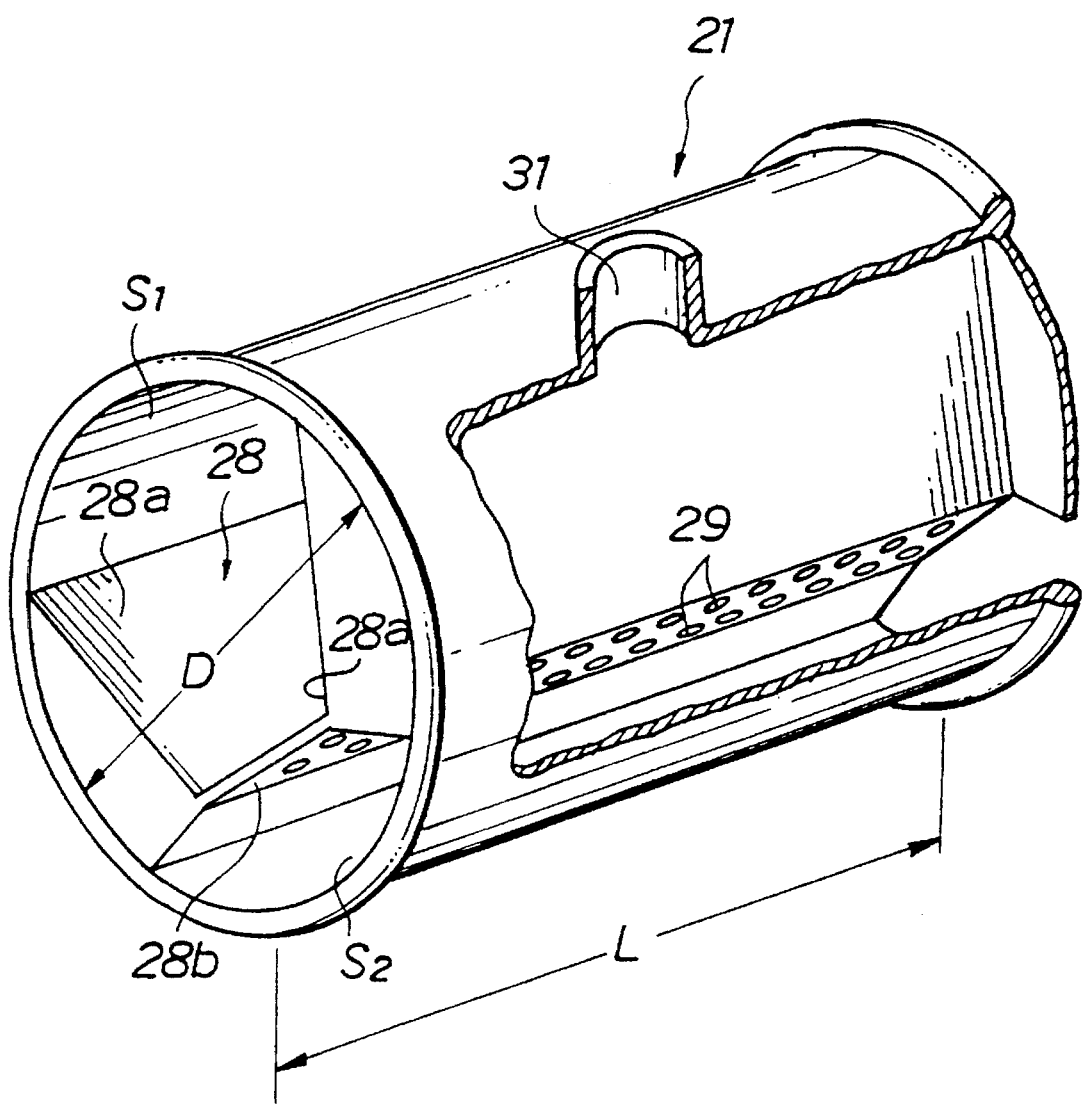
FIG. 11 is a perspective view of the same eversion nozzle of FIG. 9 after a part is removed therefrom.

Next, another embodiment of the eversion nozzle of the invention shall be described with reference to FIGS. 9 through 11. Incidentally, FIG. 9 is a vertically-slit sectional view of an eversion nozzle, FIG. 10 is a cross section taken along the line A—A of FIG. 9, and FIG. 11 is a perspective view of the same eversion nozzle after a part is removed therefrom.

The eversion nozzle 21 of this embodiment is formed into a hollow cylinder like the eversion nozzle 1 of the first embodiment, and its length L is designed in relation to the inner diameter D such that D/5<L<2D. The interior of the eversion nozzle 21 is divided into two rooms $S_1$ and $S_2$ by means of a partition 28, which is shaped like a trough.

This partition 28 comprises a pair of sloped side plates 28a which converge downwards and a narrow horizontal bottom plate 28b providing a floor to the two plates 28a. A plurality of drain holes 29 are made in the bottom plate 28b. At a top of the eversion nozzle 21 is formed an air introduction port 30, which opens into the room $S_1$, and on either side of the eversion nozzle 21 is formed a drain port 31 at a location slightly higher than the central axis of the nozzle 21, each port 31 opening into the room $S_2$.

Figure 12:
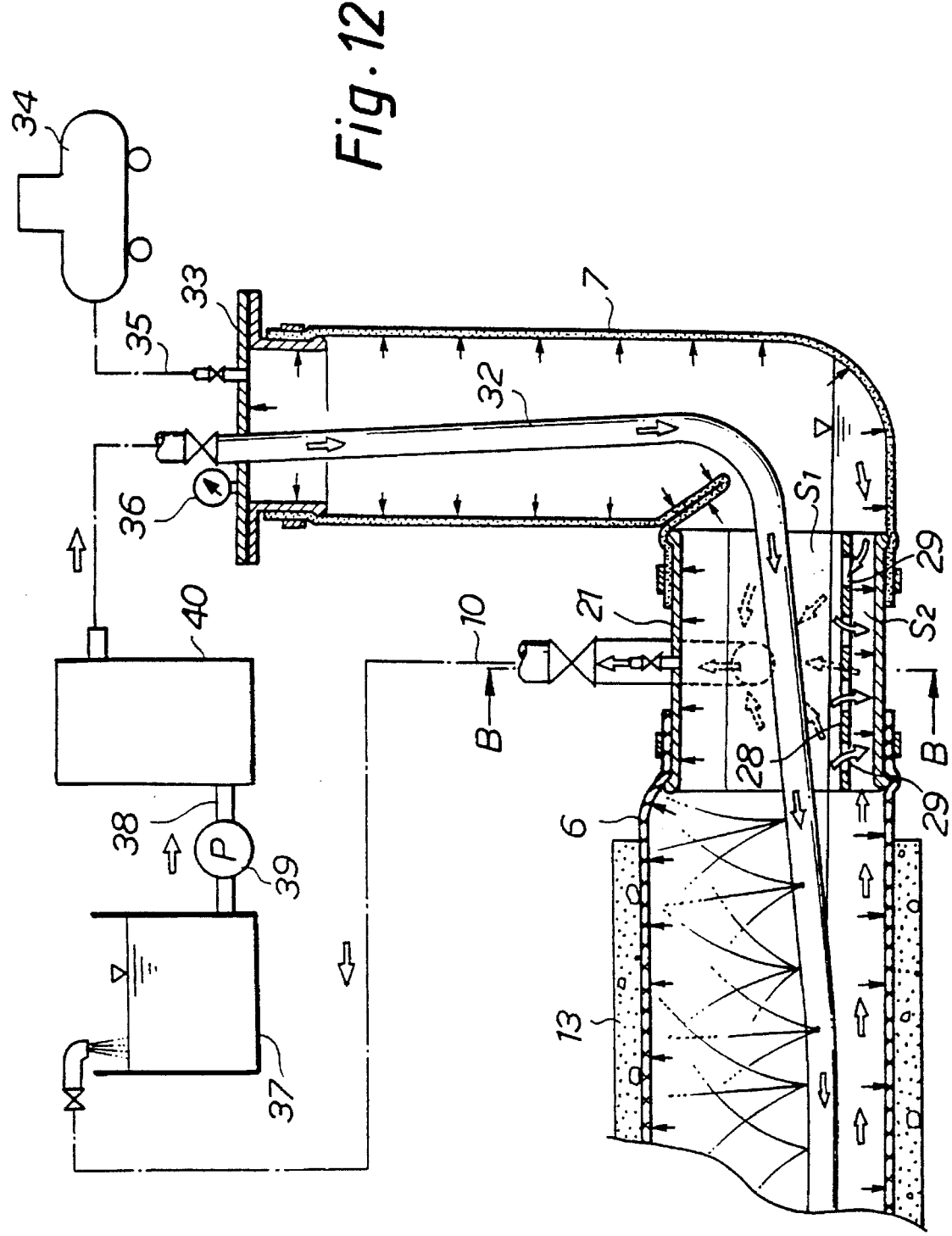
FIG. 12 is a sectional view of the elements actively involved in an eversion operation according to the invention.
Figure 13:
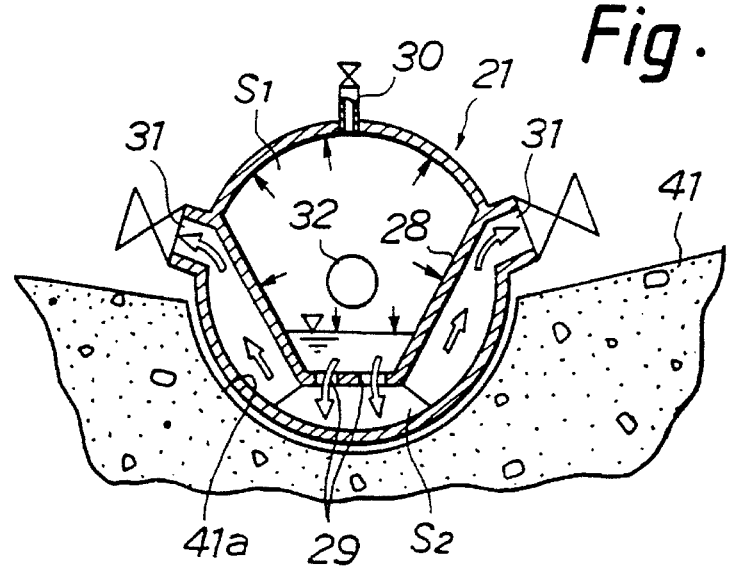
FIG. 13 is a sectional view taken along the line B—B of FIG. 12.
Figure 14:
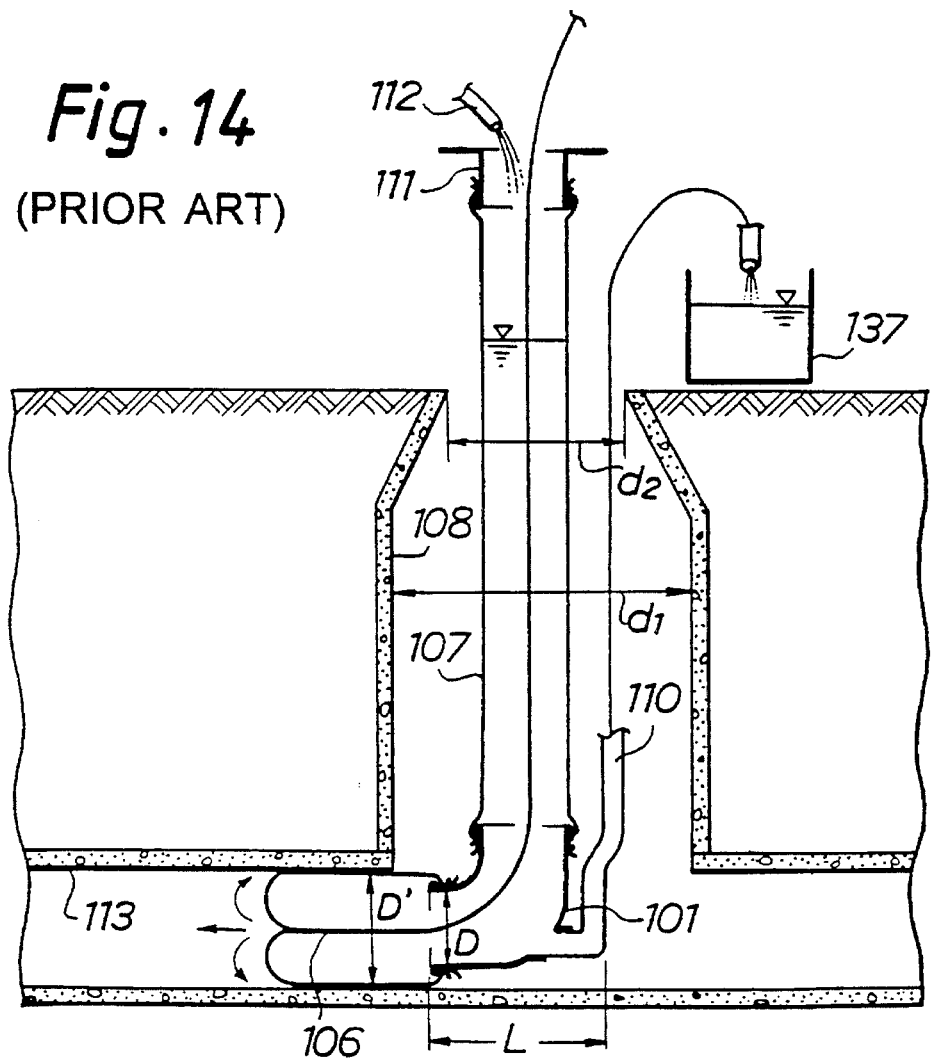
FIG. 14 is a sectional view useful to explain a method for everting a tubular liner bag wherein a conventional eversion nozzle is used.

Now, how the tubular liner bag is everted through this eversion nozzle 21, according to the present tubular conduit repair method, shall be explained with the help of FIGS. 12 and 13. Incidentally, FIG. 12 is a sectional view of the elements actively involved in this eversion operation, and FIG. 13 is a sectional view taken along the line B—B of FIG. 12.

In this embodiment, the tubular liner bag 6 is everted from the eversion nozzle 21 into the tubular conduit 13 in the similar manner as in the foregoing embodiment (the procedure as illustrated in FIGS. 2 through 6). Incidentally, as the tubular liner bag 6 is everted into the tubular conduit 13, a sprinkler hose 32 with the front end closed is drawn into the everted tubular liner bag 6 past the guide tube 7 and the eversion nozzle 21, as shown in FIG. 12.

When the entire length of the tubular liner bag 6 is everted into the tubular conduit 13, the upper open end of the guide tube 7 is sealed with a cap 33. Now, the sprinkler hose 32 is passed airtight through a hole made in the cap 33, which is also equipped with a pressure gauge 36 and provides an opening for an air hose 35 from a compressor 34 to open into the guide tube 7.

Furthermore, the air hose 9 is connected to the air introduction port 30 of the eversion nozzle 21 to communicate with the room $S_1$ of the eversion nozzle 21, and the draining hoses 10 are connected to the respective drain ports 31 to communicate with the room $S_2$. The other ends of the draining hoses 10 are held to open over a water tank 37 installed on the ground.

This water tank 37 communicates with a boiler 40 by way of a pipe 38 and a pump 39, and to this boiler 40 is connected the other end of the sprinkler hose 32.

When the compressor 34 is driven to supply compressed air to the guide tube 7 via the air hose 35, the tubular liner bag 6 is inflated with the air pressure, and is pressed tightly against the inner wall of the tubular conduit 13, as shown in FIG. 12.

When the pump 39 and the boiler 40 are driven, the hot water heated in the boiler 40 is rushed into the sprinkler hose 32, and sprinkled from the numerous punctures made along that portion of the sprinkler hose 32 which is drawn inside the everted liner bag 6, with equal strength, as shown in FIG. 12, in observance of Pascal's law. As the result, the tubular liner bag 6 is heated with the hot water.

After hitting upon the inner wall of the tubular liner bag 6, the hot water falls and gathers in the bottoms of the tubular liner bag 6, the eversion nozzle 21 and the guide tube 7. Pressed by the air pressure, however, the hot water in the room $S_1$ of the eversion nozzle 21 rushes into the room $S_2$ through the drain holes 29 made in the bottom plate 28b, and then it is pushed up and discharged from the eversion nozzle 21 via the drain ports 31.

The lukewarm water discharged from the eversion nozzle 21 is then pushed to return to the water tank 37 by way of the draining hoses 10, and the pump 39 continuously transfer the water in the water tank 37 to the boiler 40 by way of the pipe 38. The water is then heated again by the boiler 40, and sent out again into the sprinkler hose 32 to be used to heat the tubular liner bag 6.

By continuously sprinkling the circulated hot water on the inner wall of the tubular liner bag 6, the latter is kept heated and, as a result, the thermosetting resin impregnated through the thickness of the tubular liner bag 6 is cured and thus the tubular conduit 13 is lined with the hardened tubular liner bag 6.

According to this embodiment, therefore, the hot water that collects in the room $S_2$ of the eversion nozzle 21 is pushed up and discharged by means of the propelling power of air pressure, so that it is now possible to provide the drain ports 31 at a location higher than the central axis of the nozzle 21. By virtue of this fact, even when a lower part of the eversion nozzle 21 is fitted in a ditch 41a formed in the bottom 41 of the manhole, as shown in FIG. 13, and thus the hot water cannot be discharged from the lower part of the eversion nozzle 21, it is now possible to let the hot water stream out from the higher part of the eversion nozzle 21.

Incidentally, it is needless to say that all the effects obtained in the first embodiment wherein the eversion nozzle 1 is used are all attainable in the present embodiment as well.

As is clear from the above description, according to the invention, it is now not necessary to install the eversion nozzle on the ground and invert the tubular liner bag from the ground to the underground tubular conduit, so that it is now possible to line the conduit without sacrificing a substantial length of the tubular liner bag, even when the tubular conduit to be lined has a relatively large inner diameter; as a result, a significant cost reduction of the repair operation is attained.

What is claimed is:

1. An eversion nozzle for repairing an underground tubular conduit by lining the inner wall of the tubular conduit with an everted tubular liner bag impregnated with a hardenable liquid resin, characterized in that said nozzle is a hollow straight cylinder and that the inner space of the nozzle is divided into a main room and a corridor room by means of a perforated partition, said main room having an introduction port by which air is received and said corridor room having a drain port by which fluid is let out at a location slightly higher than the central axis of the eversion nozzle.

2. The eversion nozzle as claimed in claim 1, wherein the length L and the inner diameter D of said nozzle hold the following relation:

$D/5 < L < 2D$.

3. A method for repairing a tubular conduit by lining the inner wall of the tubular conduit with an everted tubular liner bag impregnated with thermosetting liquid resin, having the steps of: (a) preparing a hollow cylindrical eversion nozzle whose length L and inner diameter D hold the relation such that $D/5 < L < 2D$, wherein the eversion nozzle has an inlet side, an outlet side and an outlet port; (b) passing the open end of the tubular liner bag through the eversion nozzle from the inlet side of the eversion nozzle and turning the open end of the tubular liner bag inside out to wrap around the brim of the outlet side of the eversion nozzle and to be fixed thereat; (c) fixing one end of a guide tube having end portions around the brim of the inlet side of the eversion nozzle; (d) lowering said eversion nozzle to the bottom of a manhole while holding the eversion nozzle vertically with its outlet port facing downward; (e) turning the eversion nozzle to lie horizontally such that its outlet port looks toward the tubular conduit; (f) supplying a pressurized fluid into said eversion nozzle to thereby evert said tubular liner bag from the eversion nozzle into said tubular conduit; and (g) curing a hardenable liquid resin in said everted tubular liner bag to thereby harden the bag.

4. The method as recited in claim 3, wherein said guide tube is resilient at its end portion such that said end portion can be straightened but when left alone it curls into a 90-degree bend.

5. The method as recited in claim 3, characterized by that the eversion nozzle has an introduction port by which air is received into said nozzle, that at step (f) said fluid is water, a closed space (S) is defined by the everted tubular liner bag, the eversion nozzle and a pleat formed at a bend of the guide tube, and that pressurized air is supplied to said eversion nozzle via the introduction port.

6. The method as recited in claim 3, characterized by that the inner space of the nozzle is divided into a main room and a corridor room by means of a perforated partition, said main room having an introduction port by which air is received and said corridor room having a drain port by which fluid is let out at a location slightly higher than the central axis of the eversion nozzle, that the other end of the guide tube is sealed, and that in said step (g) hot water is sprinkled on the inner wall of the everted liner bag, and during the sprinkling, pressurized air is supplied into the everted liner bag to thereby cause the sprinkled water to be discharged from said drain port of the eversion nozzle.

7. The method as recited in claim 6, characterized by that in said step (g) the pressurized air is supplied via said introduction port of the eversion nozzle.

* * * * *